April 17, 1934.    H. P. SHRIVER    1,954,896
TREASURE CHEST AND METHOD OF MAKING THE SAME
Filed Sept. 20, 1930    4 Sheets-Sheet 1

INVENTOR
Harry P. Shriver
BY Evans & McCoy
ATTORNEYS

April 17, 1934.  H. P. SHRIVER  1,954,896
TREASURE CHEST AND METHOD OF MAKING THE SAME
Filed Sept. 20, 1930  4 Sheets-Sheet 2

INVENTOR
*Harry P. Shriver*
BY
*Evans & McCoy*
ATTORNEYS

April 17, 1934.   H. P. SHRIVER   1,954,896
TREASURE CHEST AND METHOD OF MAKING THE SAME
Filed Sept. 20, 1930   4 Sheets-Sheet 3
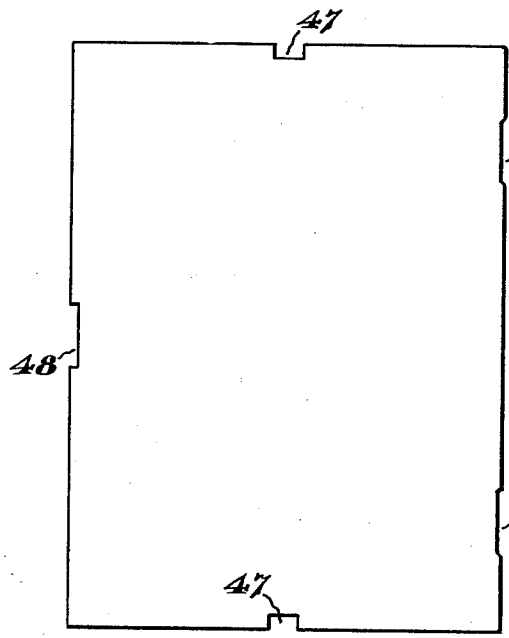
Fig. 6.
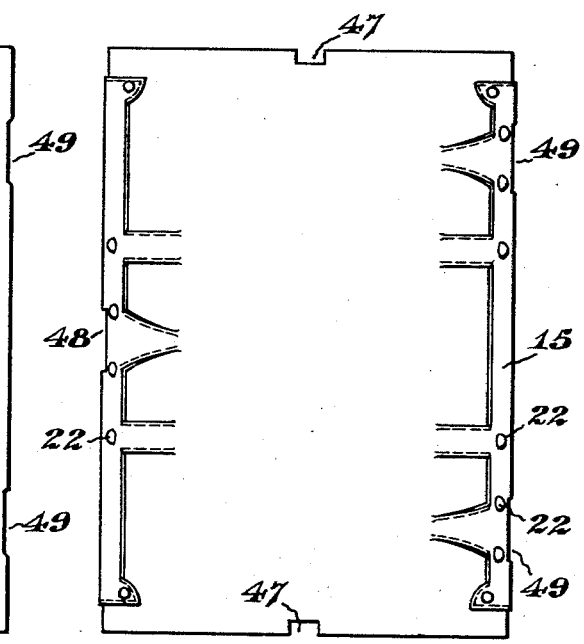
Fig. 7.
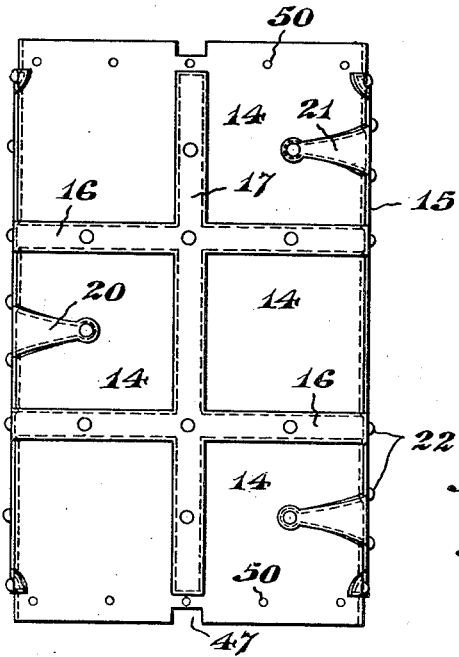
Fig. 9.
Fig. 8.
Fig. 10.
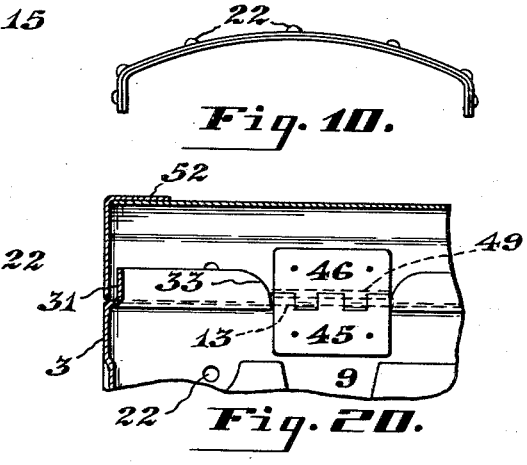
Fig. 20.
INVENTOR
Harry P. Shriver
BY
Evans, McCoy
ATTORNEYS April 17, 1934.  H. P. SHRIVER  1,954,896
TREASURE CHEST AND METHOD OF MAKING THE SAME
Filed Sept. 20, 1930    4 Sheets-Sheet 4

INVENTOR
Harry P. Shriver
BY
Evans + McCoy
ATTORNEYS

Patented Apr. 17, 1934

1,954,896

UNITED STATES PATENT OFFICE 1,954,896

TREASURE CHEST AND METHOD OF MAKING THE SAME

Harry P. Shriver, Van Wert, Ohio, assignor to Kennedy Manufacturing Company, Van Wert, Ohio, a corporation of Indiana Application September 20, 1930, Serial No. 483,167

6 Claims. (Cl. 113—120)

This invention relates to sheet metal boxes and the method of making the same, and particularly to the type of box commonly known as a "treasure chest."

One of the objects of the present invention is to provide a box resembling a treasure chest which is of improved construction and which can be economically manufactured and assembled.

Another object is to provide a box which can be easily formed from sheet metal to resemble a treasure chest, wherein depressions and embossed portions are formed to resemble straps.

Another object is to provide a box which can be easily formed of sheet metal wherein depressions and embossed portions are formed thereon to resemble intersecting straps and to resemble rivet portions.

Another object is to provide a sheet metal box which resembles a treasure chest and in which the box portion can be formed from a single sheet of metal.

Another object is to provide a new and improved method of forming a treasure chest from sheet metal.

With the above and other objects in view which will be apparent from the detailed following description, the present invention consists in certain features of construction and combinations of parts and also certain methods of manufacture which will be readily understood by those skilled in the art to which the invention appertains.

In the accompanying drawings, which illustrate a suitable embodiment of the present invention, Figure 1 is a perspective view of a completed treasure chest formed from sheet metal;

Fig. 6 is a plan view of the sheet metal blank from which the cover portion is formed;

Fig. 7 is a view corresponding to Fig. 6 but showing the first step in forming the depressions and embossed portions thereon;

Fig. 8 is an end elevation of the partially formed blank shown in Fig. 7 showing the concave form of the blank;

Fig. 9 is a view corresponding to Fig. 7 showing the completely formed cover portion;

Fig. 10 is an end elevation of the blank shown in Fig. 9 showing the final convex form of the blank;

Fig. 20 is a view taken on the inside of the box and showing one of the hinges for hinging the cover to the box portion.

The present invention contemplates a box and the method of manufacturing the same, which has the general appearance of a treasure chest provided with strap portions secured to the box body and cover with rivets. In the present invention this appearance is worked out by forming embossed strap and rivet portions on a sheet metal box body and cover, the strap-resembling portions being formed integral with the box body and the ring portions which resemble rivets being formed as an integral part of the strap-resembling portions.

Referring to the accompanying drawings, in which like numerals refer to like parts throughout the several views, the construction of the present invention comprises a box body A and a cover B hinged thereto.

Figure 3:
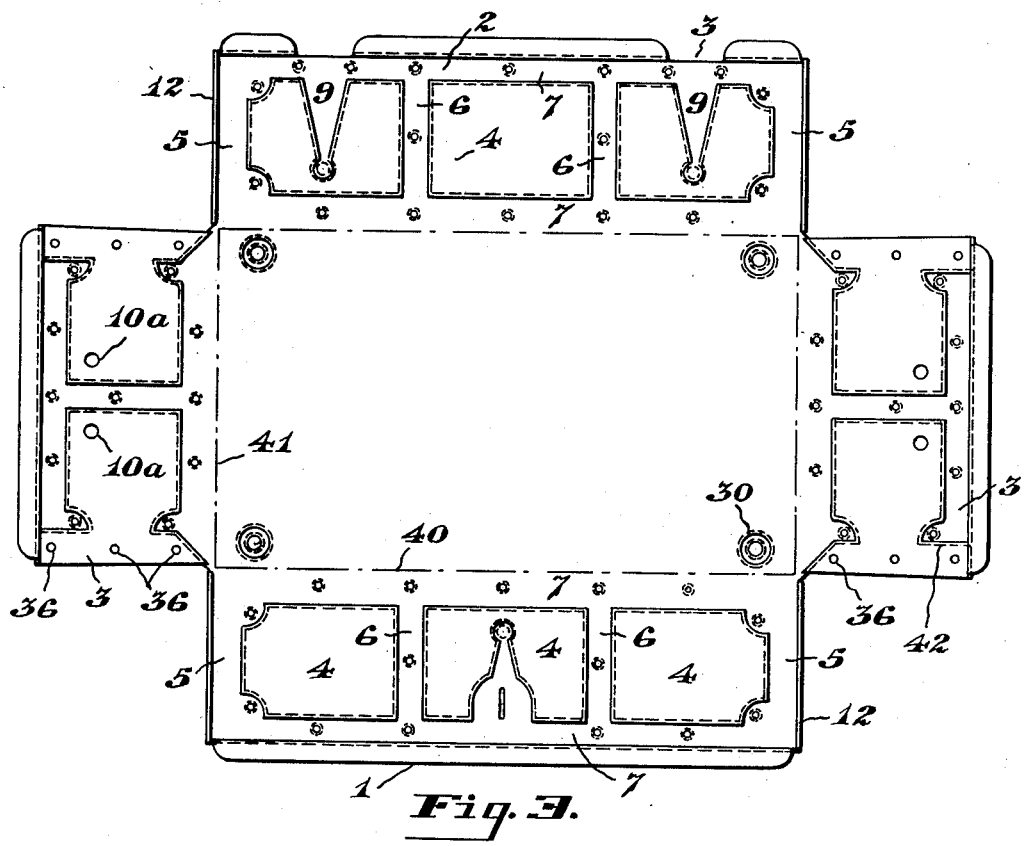
Fig. 3 is a bottom plan view of the blank showing the depressed and embossed portions formed thereon.
Figure 4:
Fig. 4 is a side elevation of the blank illustrated in Fig. 3 showing the upwardly extending flange portions and showing the offset edge portions.
Figure 5:
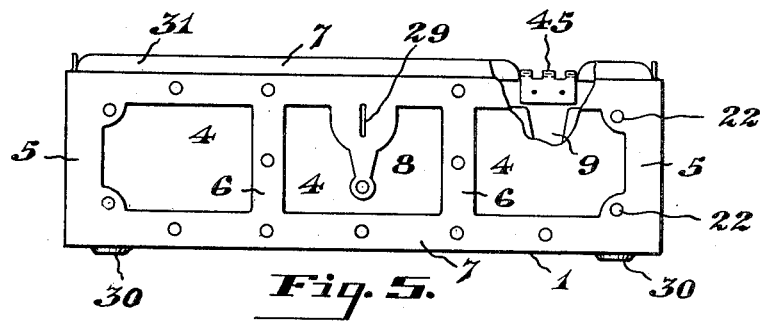
Fig. 5 is a front elevation of the box portion showing the sides and ends bent into assembled relation.

The box body A is formed from a single sheet of metal with front and rear walls 1 and 2, respectively, and end walls 3. The front and rear walls 1 and 2, respectively, are formed with rectangular-shaped depressions 4 which, as shown in Fig. 5, causes the box to have the appearance of having a plurality of intersecting strap portions which, because of the depressions 4, are an integral part of the walls 1 and 2. These consist in end strap portions 5, intermediate vertical strap portions 6, and top and bottom strap portions 7, which intersect as previously described to completely enclose the depressions 4. In the case of the front wall 1, the central depression 4 has a raised portion 8 continuous with the upper portion 7 and intermediate the central strap-like portions 6, which resembles the staple-supporting portion of a hasp and staple device. In the case of the rear wall 2, the end depressions 4 are provided with raised portions 9 which resemble the lower strap portions of large conventional strap hinges. As shown in Fig. 3, the outer corners of the end depressions 4 are curved to resemble the strap portion of conventional strap members.

Each end wall 3 is formed with upper and lower strap-resembling portions 10 and a single vertical strap-resembling portion 11 formed integral therewith. The endmost strap-resembling portions 12, however, are not formed with the end walls 3 but are in the form of flanges carried by the front and rear walls 1 and 2 respectively, these flanges being securely welded to the end walls 3.

Figure 1:
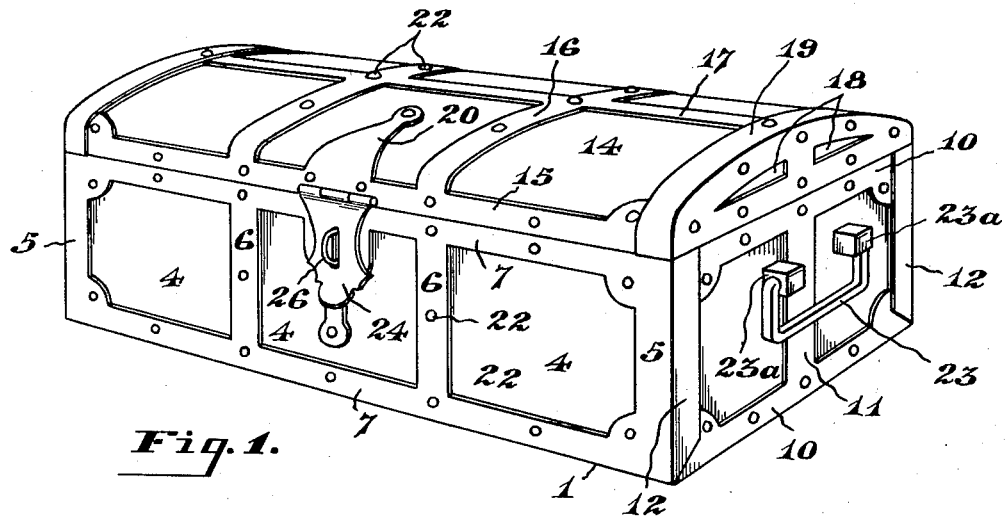

The cover B, which is carried by the box body A by means of hinges 13, is formed from a central body portion and a pair of end portions. The central portion is formed from a sheet of metal and is provided with depressions 14 and raised strap-resembling portions, these portions consisting in longitudinal edge portions 15 interconnected by laterally extending portions 16 and a longitudinally extending central strap portion 17 extending between the strap portions 16 and to the edges of the body portion. The end portions are provided with small depressions 18 and flanges 19 which are telescoped over the ends of the body portion of the cover and are securely welded thereto. It is to be noted in Figs. 1 and 9 that the strap portions 15 and 17 do not extend the entire length of the body portion of the cover but terminate short thereof, so that when the end portions are secured to the cover the strap portions 15 and 17 will appear as substantial continuations of the flanges 19 formed on the end portions of the cover. The central forward depression 14 is formed with a raised portion 20 intermediate the central strap portions 16 which resembles the hasp portion of a conventional strap, this hasp portion being in alignment with the corresponding portion 8 on the box body.

The rearmost end depressions 14 of the body of the cover portion are also provided with raised portions 21 which, when the box and cover are in united hinged relationship, resemble the upper hasp portions of conventional strap hinges.

It is to be particularly noted that throughout the extent of the various strap portions semi-circular raised portions 22 are provided at regular intervals, which resemble securing rivets.

It is preferable, as shown throughout the several views, to form the cover portion B to a curved shape, although it is to be understood that the cover may be of any suitable shape. Suitable hinged handle members 23 are secured to the ends of the box so that the box may be easily picked up and carried from place to place, and also to have the general appearance of the handles of a treasure chest.

Figure 19:
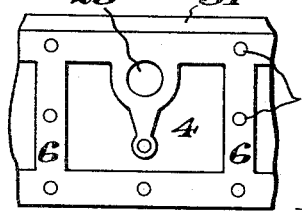
Fig. 19 is a partial front elevation of the box portion showing an alternative locking means.

The box body and cover can be locked by means of a hasp 24 which is hinged to a plate 25 secured to the inner front face of the cover portion. This hasp is arranged to receive a staple 26 which has its ends extending through the raised portion 8 of the front wall of the box body and secured to a plate 27 which is rigidly secured to the inner side of the front wall of the box body. If desired, however, the staple may be replaced with a lock of the barrel type, as shown in Fig. 19, which can be arranged to engage a suitable portion carried by the cover portion, or, if desired, the barrel lock may be provided and carried by the hasp portion and be arranged to engage an opening formed in the portion 8 of the box body. The arrangement in Fig. 19 is provided to take care of either of these conditions, and in case it is desired to form a large opening in the portion 8 for the reception of the locking fingers where the lock is carried by the hasp, instead of the narrow slot 29 which receives the staple portion 26, the die portion may be formed with a suitable removable plate to meet either of the conditions shown in Figs. 5 or 19 for the central depression.

Suitable downwardly extending projections 30 are formed in the bottom of the box body, so that the bottom of the box can be supported a slight distance above the supporting surface.

It will be seen that the upper edges of the walls of the box are inwardly offset at 31, so that when the cover is closed the edge portions thereof will overlap with the walls of the box.

In the formation of the box body, the box body is first formed from a blank having the general shape shown in Fig. 2, and it will be noted that the blank has end portions which later form the end walls 3 of the box body and side portions which later form the side walls 1 and 2 of the box body. The corners between the edges of the side and end portions are inwardly notched at 32 in the side portions to provide the flanges 12. The rear end portion is also formed with a pair of spaced notches 33 along its edge, which greatly assists in the assembly of the hinge parts to the box body.

Figure 2:
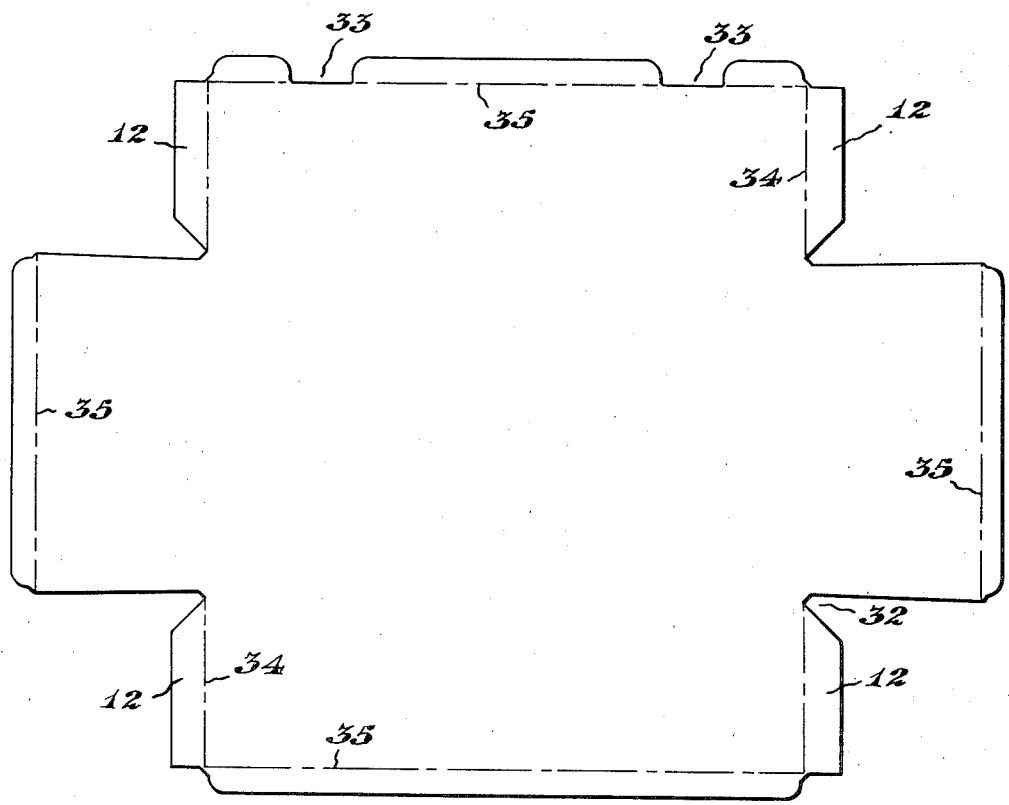
Fig. 2 is a plan view of the initial blank of sheet metal from which the box portion is formed.

The blank of the shape shown in Fig. 2 is placed in the forming die, which in a single operation completely forms the depressions 4 and the portions 8 and 9 in the side and end portions. During this operation the side flanges 12 are bent at right angles to the blank substantially along the dotted lines 34 in Fig. 2 and the offset portions 31 are also formed substantially on the line 35 shown in Fig. 2. The raised portions 22, which resemble rivets, are also formed during this single operation and simultaneously therewith small welding projections 36 are formed along the side edges of the end portions. It is to be noted that the depressions in the end walls are formed with their bottoms flush with the side edges of the end portions, so that the flanges 12, when the box is assembled, may coact with the side edges in such a manner as to be flush with the strap-like portions 10. During the initial blanking operation small openings 10a are provided in the depression 10 of the end portions for the reception of the supports 23a for the handle members 23 and the small rectangular slot 29 is provided in the raised portion 8 for the reception of the staple member of the locking mechanism, or in the case of the construction shown in Fig. 19, the circular opening for the reception of the lock barrel is provided.

After the blank is formed in the manner just described, the sides and ends of the blank are folded perpendicular to the body portion substantially on the lines 40 and 41, respectively. During this bending operation the end portions are first folded up and then the side portions, so that the flanges 12 of the side portions may overlap with the side edges of the end portions and abut against the shoulder portions 42 formed by the strap-like portions 10 of the box body which terminate short of the edges of the end portion. The flanges 12 are then securely welded to the edge portions of the end walls of the box body substantially at the small raised projections 36, which are for spot-welding purposes, and during this welding operation the raised projections 36 fuse out and become substantially flush with the body of material. When the ends and side walls of the box are folded in this manner it will be observed that the upper edges thereof are inwardly offset, as shown in Fig. 5. After this assembly operation the locking staple 26 is inserted through the slot 29 in the raised portion 8, and the plate 27 carrying the staple 26 is securely welded to the inside of the front side wall 1. The supports 23a for the handle members 23 are extended through the openings and securely riveted over to rigidly secure the handle members 23 to the ends of the box. The lower halves 45 of the hinge members 46 are then positioned rearwardly of the raised portions 9 and securely welded thereto. The notched-out portions 33 formed at the edge of the rear walls 2 form locating means for assisting in holding the lower hinge portions 45 in place during the welding operation.

The cover portion of the box is formed from the flat blank of metal shown in Fig. 6 which is provided with a notch 47 in each end edge thereof, a notch 48 in the forward edge thereof, and a pair of spaced notches 49 in the rearward edges thereof. The first step in forming the cover portion is to press the blank shown in Fig. 6 to the shape illustrated in Fig. 7, which is of concave shape, the strap-like portion 16, the hasp-representing portion 20, and the hinge-representing portion 21 being only partially formed during this operation. As shown in Fig. 7, the edge strap-like portions 15 are completely formed together with the rivet portion 22 and these strap-like portions 15 terminate short of the end edges of the blank. During this forming operation the blank is dished downwardly to the concave shape shown in Fig. 8. The blank shown in Figs. 7 and 8 is then placed in a second forming die and dished upwardly, as shown in Fig. 10, during which operation the strap-like portion 16, the strap-like portion 17, the hasp-representing portion 20, and the hinge-representing portion 21 are completely formed together with their integral rivet portions 22. Also, during this forming operation the longitudinal edges are flanged downwardly, as shown in Fig. 10. Raised welding projections 50 are also formed during the second forming operation, which are for the purpose of securely welding the end wall portions of the cover.

Figure 11:
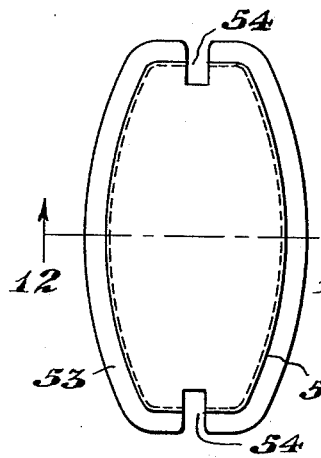
Fig. 11 is a plan view of the blank from which the two end portions of the cover are formed.
Figure 12:
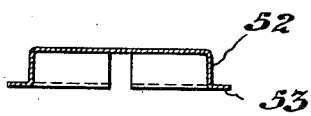
Fig. 12 is a transverse section through the blank illustrated in Fig. 11 taken on the line 12—12 of Fig. 11.

The end wall portions for the cover are simultaneously formed in a single piece from a blank of metal and, as shown in Figs. 11 and 12, are first blanked to a cup-shaped form having side flanges 52 and marginal flanges 53 provided with notched portions 54 at the extreme ends thereof, the side flanges 52 being curved to conform in shape to the cover portion.

Figure 13:
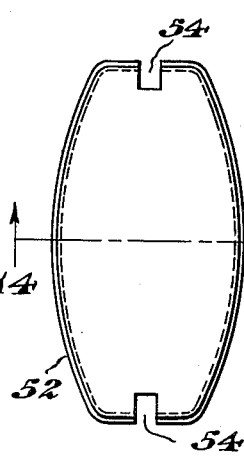
Fig. 13 is a plan view of the blank corresponding to the view in Fig. 11 showing the second step in the operation of forming the end portions of the cover.
Figure 15:
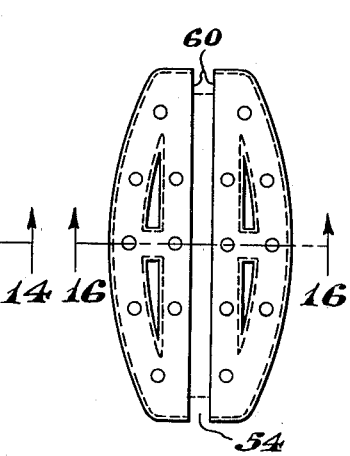
Fig. 15 is a plan view of the completely formed end portions of the cover showing the same in separated position.
Figure 14:
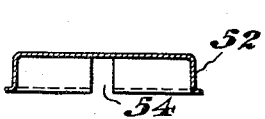
Fig. 14 is a transverse section taken on the line 14—14 of Fig. 13.
Figure 16:
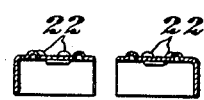
Fig. 16 is a transverse section taken substantially on the line 16—16 of Fig. 15.
Figure 17:
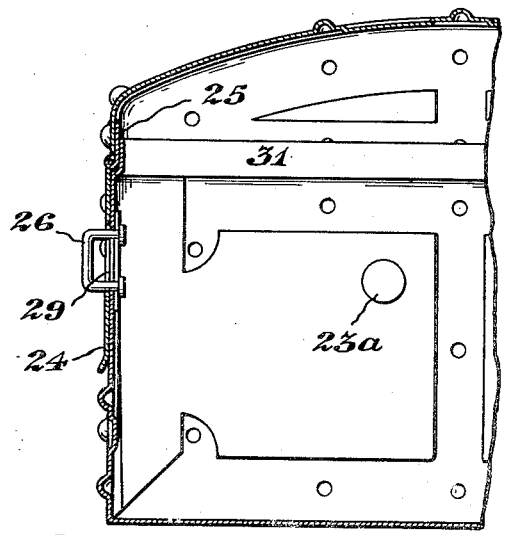
Fig. 17 is a fragmentary transverse section taken through the center of the completely assembled treasure chest.
Figure 18:
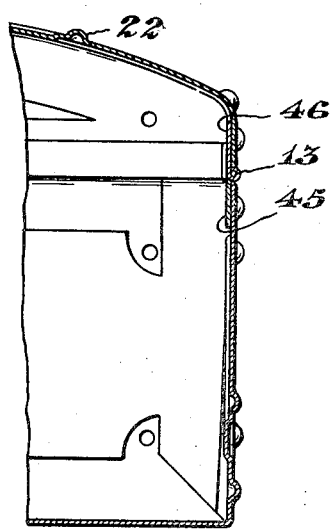
Fig. 18 is a fragmentary transverse section taken through one of the hinge portions of the completely assembled treasure chest.

The next step in forming the end portions consists in trimming of the marginal flanges 53 to the shape shown in Figs. 13 and 14, and during the third forming operation the depression and rivet portions are completely formed and at the same time the metal is drawn so as to flatten out the marginal flanges to bring them flush with the side flanges 52 and furthermore at the same time the formed member is severed along the lines 60 and 61 which are at the edges of the slots 54 so that two separate end wall portions are provided. These end wall portions are telescoped over the ends of the cover body with the side flanges 52 abutting against the end edges of the cover and abutting against the shoulders formed by the strap-like portions 15 which terminate short of the ends of the cover portions. The flanges 52 of the end wall portions are then securely welded to the ends of the cover through the medium of the welding projections 50. The upper portion 25 of the hasp is securely welded to the inner surface of the raised portion 20 on the cover with the curled portion which receives the pivot pin lying within the notched-out portion 48, as shown in Fig. 17, and the upper portions 46 of the hinges are securely welded to the inner sides of the raised portions 21 of the cover with the curled portions lying within the notches 49 formed at the rear longitudinal edge of the cover. The cover portion thus completely formed is positioned on the box portion and the pivot pins inserted through the curled portions of the hinges to hingedly secure the cover to the box body.

The completed box very closely resembles a treasure chest and it is readily seen that the chest can be very economically manufactured and assembled, since the strap and rivet-resembling portions are all formed integral with the body portions of the box body and cover. These strap and rivet portions are formed in simple forming operation.

The treasure chest is readily adaptable for jewel cases, candy boxes, cigar and cigarette humidors and for many other purposes.

It is to be noted that the box has the appearance of being bound by strap members secured thereto by rivets.

Aside from the specific embodiments of the invention herein shown and described, it will be understood that numerous details of the construction or steps in the forming operation may be altered or omitted without departing from the spirit and scope of this invention, and I do not desire to limit the invention to the exact construction herein set forth, as I desire to claim the invention broadly as well as specifically as indicated in the appended claims.

What I claim is:

1. The method of forming a box body, which consists in notching out the corners of a flat metal blank, embossing strap-resembling portions and rivet-resembling portions on the extending side and end portions formed by said notching, simultaneously forming flanges at the ends of said side extending side portions, bending said end extending portions perpendicular to said blank, bending said side extending portions perpendicular to said blank with said flanges overlapping said end extending portions, and rigidly securing said flanges to said end extending portions.

2. The method of forming a convex cover for a box which consists in stamping a blank of metal to concave shape and simultaneously embossing longitudinal strap-resembling portions on the side edges thereof and embossing partial transversely extending strap-resembling portions adjacent the side edges thereof, and then stamping said blank to convex shape while completely embossing said transversely extending portions and bending said side edges into parallel relationship.

3. The method of forming ends for a box cover, which consists in stamping a sheet of metal to cup shape and simultaneously forming oppositely disposed notches at the edges thereof, and then cutting said blank in the lines of the sides of said notches to provide a pair of end members and simultaneously forming said end members with depressions and with embossed rivet-resembling portions.

4. The method of forming a single piece box body of sheet metal which consists in forming a flat sheet metal blank with oppositely disposed side wing portions and oppositely disposed end wing portions, simultaneously forming a plurality of embossed strap-resembling portions on said side and end wing portions to substantially the same thickness as said blank, and rivet-resembling portions on said strap-resembling portions, simultaneously forming flanges at the ends of said side wing portions, bending said wing portions perpendicular to said blank with said flanges overlapping said end wing portions, and rigidly securing said flanges to said end wing portions.

5. The method of forming a single piece box body of sheet metal, which consists in forming a flat sheet metal blank with side and end wings, forming spaced generally rectangular depressions in said side wings to provide a continuous strap-resembling portion around the marginal edges of said side wings and strap-resembling portions interconnecting the sides of said continuous strap-resembling portions, simultaneously forming spaced depressions in the ends of said end wings to provide spaced strap-resembling portions extending longitudinally of said end wings and terminating short of the ends thereof in abrupt shoulders, and a central transverse strap-resembling portion interconnecting said spaced strap-resembling portions last mentioned, simultaneously forming embossed rivet-resembling portions on all of said strap-resembling portions, forming flanges at the ends of said side wings, bending said side and end wings perpendicular to said blank with said flanges overlapping said end wings and abutting the said shoulders of said end wings, and securing said flanges to said end wings.

6. A box body resembling a treasure chest having a bottom and four walls, each of said walls having longitudinally extending embossed strap-resembling portions along their upper and lower edges, the said strap-resembling portions of one pair of opposed walls terminating short of the end edges thereof to provide abrupt shoulders, said other pair of opposed walls having transversely extending embossed strap-resembling portions along their end edges continuous with the longitudinally extending embossed portions thereof and having perpendicular end flanges secured to the ends of the other pair of walls and abutting said shoulders, said walls also having transversely extending embossed strap-resembling portions continuous with said longitudinally extending portions intermediate the ends thereof.

HARRY P. SHRIVER.